United States Patent [19]

Imagawa

[11] Patent Number: 4,620,315
[45] Date of Patent: Oct. 28, 1986

[54] AUTOMATIC FREQUENCY CONTROL CIRCUIT IN A STEREO FM RADIO RECEIVER

[75] Inventor: Toshiyuki Imagawa, Tokyo, Japan
[73] Assignee: Clarion Co., Ltd., Tokyo, Japan
[21] Appl. No.: 698,307
[22] Filed: Feb. 5, 1985

[30] Foreign Application Priority Data

Feb. 9, 1984 [JP] Japan .................................. 59-23749

[51] Int. Cl.$^4$ ............................................. H04H 5/00
[52] U.S. Cl. ......................................... 381/10; 381/13
[58] Field of Search ................ 381/10, 11, 13; 455/52, 455/65

[56] References Cited

U.S. PATENT DOCUMENTS

| | | | |
|---|---|---|---|
| 3,823,268 | 7/1974 | Modafferi ................ | 381/10 |
| 4,157,455 | 6/1979 | Okatani et al. .......... | 381/11 |
| 4,356,350 | 10/1982 | Ienaka .................... | 381/10 |
| 4,416,024 | 11/1983 | Ugari et al. ............. | 381/10 |
| 4,419,541 | 12/1983 | Kishi et al. ............. | 381/13 |
| 4,480,335 | 10/1984 | Kishi ..................... | 381/13 |

Primary Examiner—Forester W. Isen
Attorney, Agent, or Firm—Flynn, Thiel, Boutell & Tanis

[57] ABSTRACT

An automatic frequency control circuit is used in an FM stereo radio receiver which includes an intermediate frequency amplifying and detecting circuit producing an output for driving a signal meter and includes a multiplexer, so that the multiplexer effects controls to reduce noises in stereophonic and monophonic reception responsively to the signal meter driving circuit by changing its separation ratio and attenuation ratio. The circuit comprises: an adder which adds a dc voltage obtained by rectifying and smoothing ac components in the signal meter driving voltage to a dc voltage obtained by rectifying and smoothing noise components in an output from a noise cancellor; a comparator which compares the sum voltage from the adder with original dc components in the signal meter driving circuit; and a subtraction voltage generator which produces a subtraction voltage responsive to the difference between the compared two voltages, so that the noise reducing controls are effected responsively to the subtraction voltage.

3 Claims, 7 Drawing Figures

4,620,315

AUTOMATIC FREQUENCY CONTROL CIRCUIT IN A STEREO FM RADIO RECEIVER

FIELD OF THE INVENTION

This invention relates to a stereo FM radio receiver, and more particularly to an automatic frequency control circuit thereof for reduction in noise while received signals are weak.

BACKGROUND OF THE INVENTION

One prior art stereo FM radio receiver having an automatic frequency control circuit is introduced hereunder, referring to FIG. 1. Reference numeral 1 designates an antenna, 2 is an FM tuner, 3 is an intermediate frequency (IF) amplifying and detecting circuit, 4 is a noise canceller, and 5 is a multiplexer connected to an audio stage via paths 6. A terminal $X_1$ of the IF amplifier/detector 3 is connected to an intermediate signal meter (not shown) for indicating the level of a received signal. An output voltage Vs from the terminal $X_1$ for driving the signal meter is applied to a terminal $X_2$ of the multiplexer 5 via a resistor $R_1$ so as to reduce noises when received signals are weak during stereophonic reception. The same output voltage Vs is also applied to a terminal $X_3$ of the same multiplexer 5 after being divided by resistors $R_2$ and $R_3$ so as to reduce noises when received signals are weak during stereophonic or monophonic reception. The voltage Vs appearing at the terminal $X_1$ increases with the input level at the antenna 1 up to a saturation as shown in FIG. 2. Thus the stereo FM receiver reduces noises in a weak FM reception, by entering the voltage Vs in the multiplexer 5 to actuate it to effect two controls herein named "stereo noise control (SNC)" and "high-cut control (HCC)", respectively.

It should be noted that since the circuit of FIG. 1 is known and not directly related to the invention, a detailed explanation thereof is omitted here.

The stereo noise control (SNC) is first discussed hereunder. It is known that signal-to-noise ratios in stereophonic reception and monophonic reception represent changes as shown by the coordinate system of FIG. 3, in which the abscissa is the signal level received by the antenna 1 (FIG. 1), the ordinate is the signal-to-noise ratio at the tuner 2 in decibel, a line 7 shows changes in signal-to-noise ratio in stereophonic reception, and a line 8 shows changes in signal-to-noise ratio in monophonic reception. In practice, the two lines 7 and 8 do not maintain a parallel relationship due to the hum level, carrier leakage and other factors. More specifically, the difference between the two lines 7 and 8 is small as shown by numeral 9 at their horizontal portions (saturations) designated by 10 and 11, but it is large as shown by numeral 9' at their angled portions. This means that the difference between the signal-to-noise ratios in stereophonic and monophonic receptions is large at low antenna input levels but small at high antenna input levels. For example, the difference is about 21.6 dB when the time constant for emphasis is 50 μsec and about 23 dB when the time constant is 7.5 μsec. Therefore, at a point A (FIG. 3) where the antenna input level is rather low, a large noise is heard by human ears in stereophonic reception.

In this connection, a voltage from the terminal $X_1$ (FIG. 1) is applied to the terminal $X_2$ of the multiplexer 5 so that the multiplexer 5 automatically changes its separation ratio in response to the voltage and with changes in the antenna input level from an intermediate level to a low level, thereby reducing the noise sensed by human ears. This is what the Applicant calls "SNC" in the instant text. FIG. 4 shows how the separation ratio is changed with the voltage Ve applied to the terminal $X_2$.

Next, the high-cut control (HCC) is discussed below. When received signals are weak in either stereophonic or monophonic FM reception, noises are conspicuous in some reproduction frequency bands. This is because an FM broadcasting uses a wide bandwidth, and the received signals are often not reproduced in a good condition in some frequencies near the definite limits of the bandwidth when in particular the received signals are weak, so that noises are stressed with respect to the reproduced signals and deteriorate the signal-to-noise ratio. In order to reduce the deterioration in signal-to-noise ratio, the frequency characteristics of the multiplexer 5 are automatically controlled as the antenna input level changes from an intermediate level to a low level. FIG. 4 shows how the control is effected. A graph 12 shows how the attenuation is changed with fequency when the voltage applied to the terminal $X_3$ is $V_{x31}$ which is responsive to the saturation value of the voltage Vs of the terminal $X_1$ corresponding to an intermediate antenna input level. Similarly, a graph 13 shows how the attenuation is changed when the terminal $X_3$ receives a voltage $V_{x32}$ which is smaller than the voltage $V_{x31}$ and corresponding to a smaller value of the voltage Vs at the terminal $X_1$ responsive to a lower antenna input level. A graph 14 corresponds to a voltage $V_{x33}$ at the terminal $X_3$ which is smaller than $V_{x32}$ and responsive to a still smaller voltage at the terminal $X_1$ with a still lower antenna input level. In a high reproduction frquency band, the graphs 12, 13 and 14 drop with different curves. Namely, the graph 13 represents a larger drop than the graph 12, and the graph 14 represents a still larger drop than the graph 13. This means that the attenuation is increased with decrease of the voltage at the terminal $X_3$, i.e. with decrease of the antenna input level. In this manner, the signal-to noise ratio in a low antenna input level is effectively improved. This is what the Applicant calls "HCC" in the present text.

In general the SNC and HCC are performed when the voltage at the terminal $X_2$ is 1.5 V to 0 V.

Noises are also produced due to multipaths in either stereophonic or monophonic FM reception. FIG. 6 is a block diagram of a prior art FM stereo radio receiver which is designed to reduce such noises.

Reference numerals 15 and 19 denote buffer circuits, 16 is an ac component detector, 17 is a rectifier, 18 is a smoothing circuit, and the other reference numerals designate the same circuit components as those in FIG. 1. The ac components in the voltage Vs at the terminal $X_1$ are detected by the ac component detector 16 and rectified by the rectifier 17 in a polarity opposite to the original dc components of the voltage Vs. The rectified current is smoothed by the smoothing circuit 18 and combined at a point Y with the original dc components of the voltage Vx supplied via the buffer circuit 15. The voltage at the point Y is applied to the terminals $X_2$ and $X_3$ of the multiplexer 5 via the buffer circuit 19. Since the voltage at the point Y becomes such that the original dc components are forcibly levelled down by the rectified and smoothed components, the high-cut control (HCC) and stereo noise control (SNC) are activated to effectively improve the signal-to-noise ratio during intermediate and low levels of the antenna input.

In the prior art devices, however, since the HCC and SNC are governed simply by the output voltage from the signal meter terminal $X_1$ of the IF amplifier/detector 3, their control operations are uniformly, inflexibly determined by resistors $R_1$, $R_2$ and $R_3$ (FIG. 1).

Therefore, the prior art control circuits produce the following drawbacks due to varieties in characteristics of receivers. Assuming that the voltage at the terminal $X_1$ of the IF amplifier/detector 3 is equal in some receivers, the signal-to-noise ratio of one receiver as a whole or at the IF amplification stage is often different from that of another receiver. This means that selection of the resistors $R_1$, $R_2$ and $R_3$ simply depending on the antenna input level does not always produce the best result.

Beside this, while the antenna input level is low, the noise canceller 4 is often erroneously activated and produces crackles or other noises in particular in high frequencies and high modulation degrees. The prior art control devices, however, has no means to reduce these noises.

OBJECT OF THE INVENTION

It is therefore an object of the invention to provide an automatic frequency control circuit which effects the HCC and SNC operations not only depending on antenna input levels but also related to detected noise levels and which reduces noise components produced by erroneous operations of the noise canceller during weak signal reception.

SUMMARY OF THE INVENTION

In accordance with the present invention, there is provided an automatic frequency control circuit in an FM stereophonic radio receiver which includes at least an FM tuner; an intermediate frequency amplifying and detecting circuit having an output terminal for supply of a voltage for driving a signal meter; a noise canceller; and a multiplexer having an input terminal for entering a voltage for high-cut control and another input terminal for entering a voltage for stereo noise control, said all components of the receiver being connected in the recited order, said automatic frequency control circuit comprising:

first means extracting, rectifying and smoothing ac components in said signal meter driving voltage;

second means extracting, rectifying and smoothing noise components in an output from said noise canceller;

third means summing output voltages from said first and second means;

fourth means extracting dc components in said signal meter driving voltage and comparing them with the sum voltage from said third means;

fifth means responsive to an output from said fourth means to generate an output voltage corresponding to the difference between said dc components and said sum voltage; and sixth means applying an output from said fifth means to said input terminals of said multiplexer.

The invention will be better understood from the description given below, referring to a preferred embodiment illustrated.

DETAILED DESCRIPTION OF THE PREFERRED EMBODIMENTS

Figure 1:
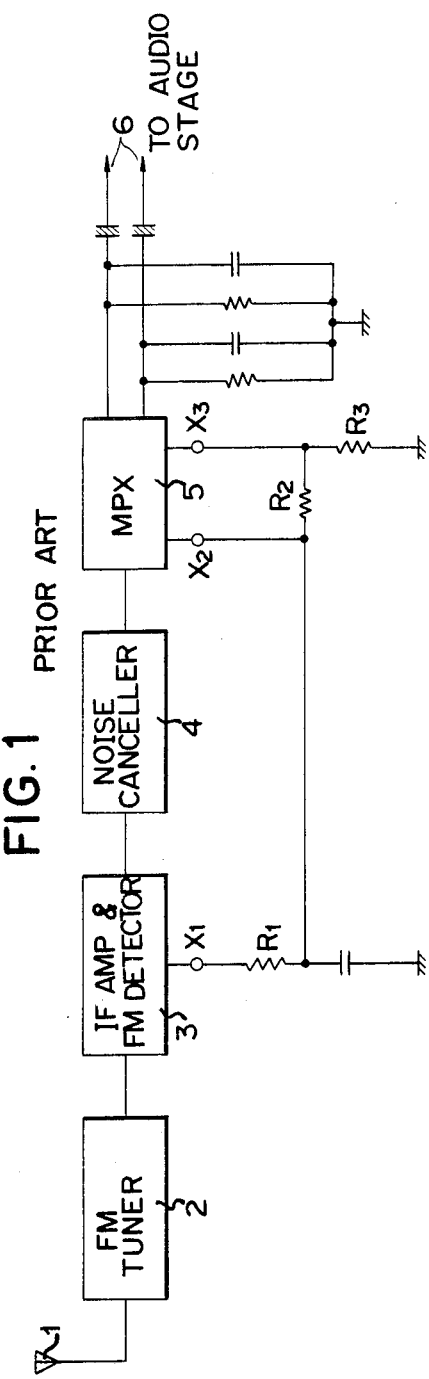
FIG. 1 is a block diagram of an FM stereo radio receiver including a prior art automatic frequency control circuit.
Figure 2:
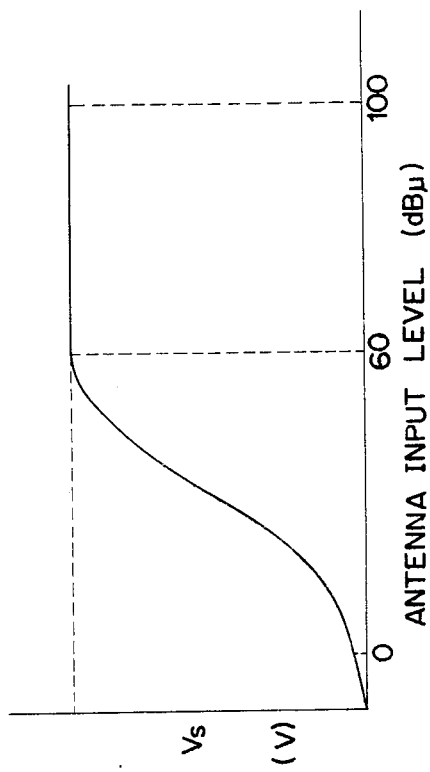
FIG. 2 is a graph which shows how the voltage at a signal meter terminal changes with antenna input level.
Figure 3:
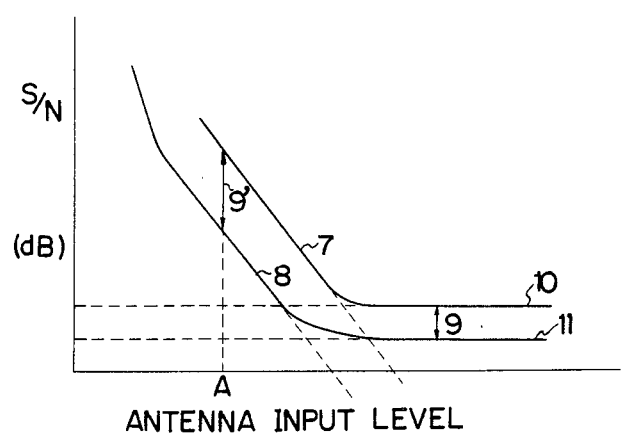
FIG. 3 is a graph which shows signal-to-noise ratios in stereophonic reception and monophonic reception with respect to the antenna input level.
Figure 4:
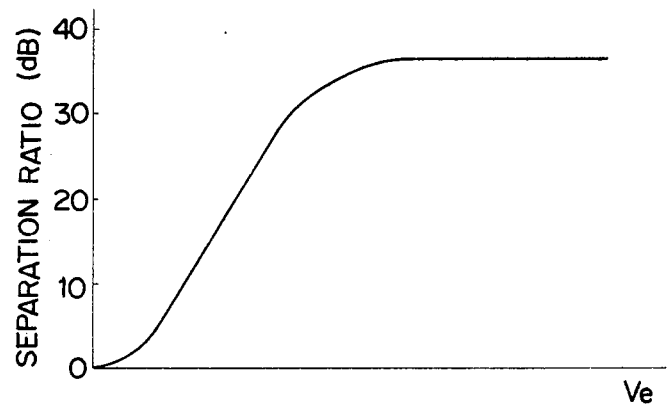
FIG. 4 is a graph which shows the separation ratio in stereophonic reception with respect to the voltage at a terminal $X_2$ for stereo noise control (SNC)
Figure 5:
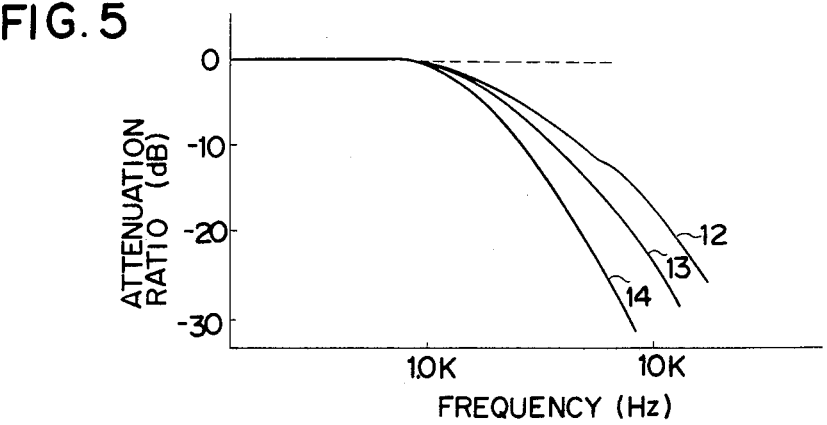
FIG. 5 is a graph which shows three different changes in attenuation ratio with frequency, the respective changes corresponding to three different voltages at a terminal $X_3$ for high-cut control (HCC)
Figure 6:
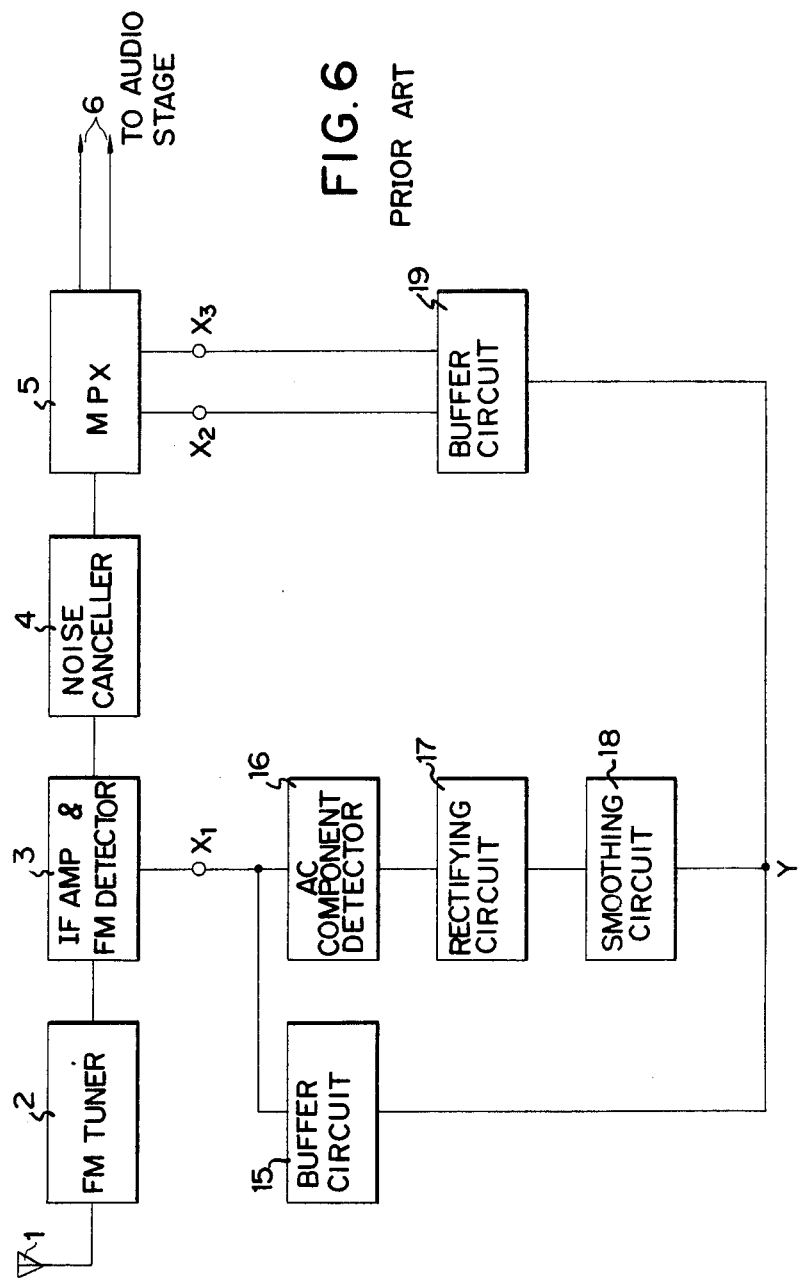
FIG. 6 is a block diagram of an FM stereo radio receiver including another prior art automatic frequency control circuit.
Figure 7:
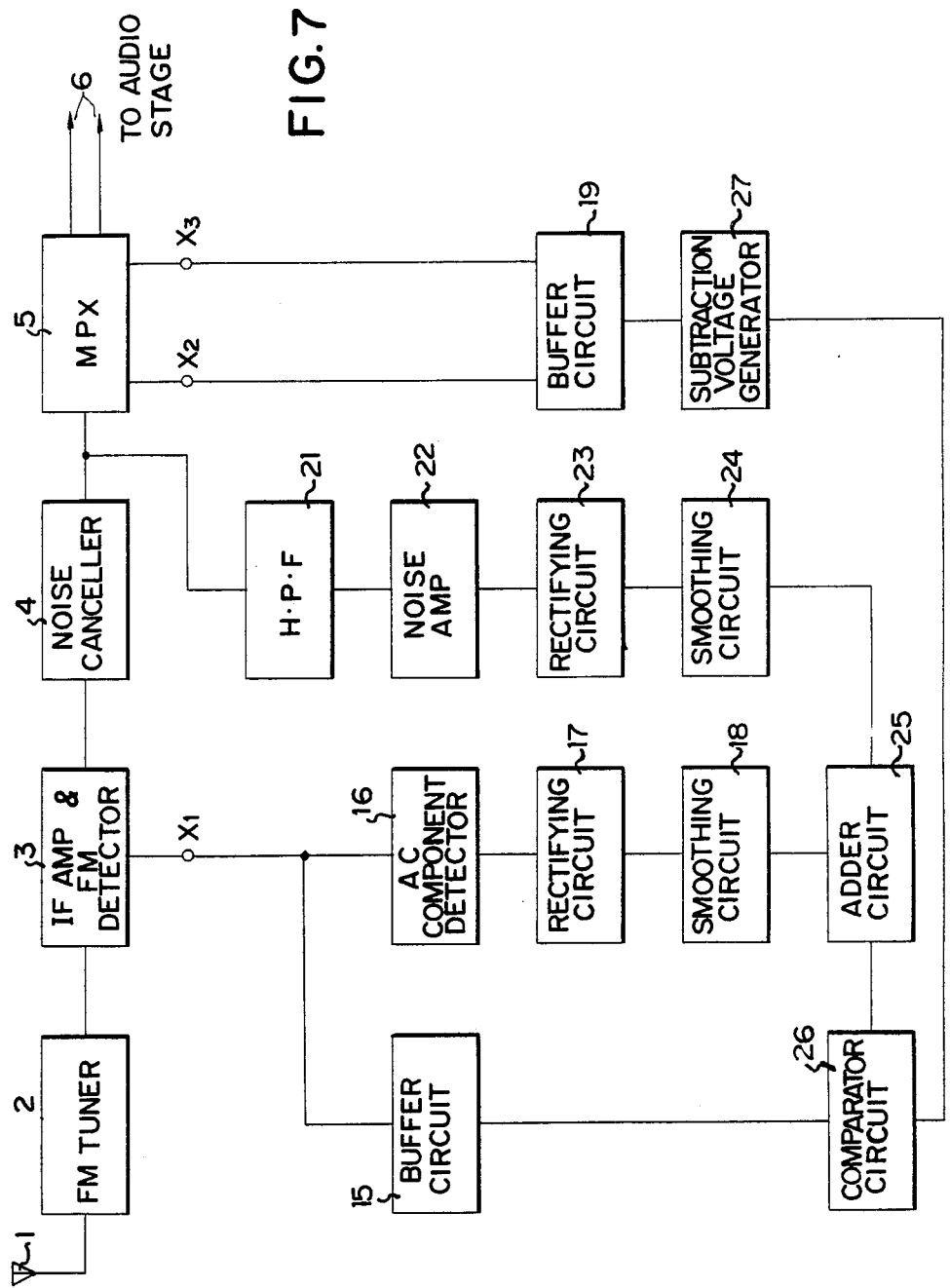
FIG. 7 is a block diagram of an FM stereo radio receiver including an automatic frequency control circuit embodying the invention.

Referring to FIG. 7 which is a block diagram of an FM stereo radio receiver including an automatic frequency control circuit embodying the invention, reference numeral 21 designates a high-pass filter, 22 is a noise amplifier, 23 is a rectifier, 24 is a smoothing circuit, 25 is an adder, 26 is a comparator, 27 is a subtraction voltage generator, and other reference numerals denote the circuit components in FIG. 6 accompanied by corresponding reference numerals.

FM stereo signals received by the antenna 1 are processed in the IF amplifier/detector 3, the noise canceller 4 and the multiplexer 5, and they are sent to right and left channels in the audio stage as shown by arrows 6. At that time, the dc components in the voltage Vs at the signal meter output terminal $X_1$ of the IF amplifier/detector 3 are extracted through the buffer circuit 15 and applied to one input terminal of the comparator 26. The ac components in the voltage Vs at the signal meter terminal $X_1$ are detected by the ac component detector 16, rectified by the rectifier 17, smoothed by the smoothing circuit 18, and applied to one input terminal of the adder 25. The noise components in the signals which passed through the noise canceller 4 or high frequency noise components produced by erroneous operations of the noise canceller 4 in a low received level are picked up by the high-pass filter 21 and converted to a dc voltage by the noise amplifier 22, rectifier 23 and smoothing circuit 24. This voltage is applied to the other input terminal of the adder 25 and added to the aforementioned dc voltage from the smoothing circuit 18. The sum dc voltage from the adder 25 is applied to the other input terminal of the comparator 26 for comparison with the original dc components entered therein via the buffer circuit 15. With the output from the comparator 26, the subtraction voltage generator 27 produces a subtraction voltage and applies it to the terminals $X_2$ and $X_3$ of the multiplexer 5 via the buffer circuit 19. Therefore, the voltage applied to the terminals $X_2$ and $X_3$ for the high-cut control (HCC) and stereo noise control (SNC) is determined not only by the antenna input level but also by the signal-to-noise ratio unique to the individual receiver.

As described above, the invention control circuit always effects the best, self-controlled frequency control in any FM stereo radio receivers which are different in gains of tuners and IF amplification stages and in other characteristics. Additionally, the invention circuit also reduces the noise components produced by fault operations of the noise canceller at low antenna input levels.

The embodiments of the invention in which an exclusive property or privilege is claimed are defined as follows:

1. An automatic frequency control circuit in an FM stereophonic radio receiver which includes at least an FM tuner; an intermediate frequency amplifying and detecting circuit responsive to said FM tuner having an output terminal for supply of a voltage for driving a signal meter; a noise canceller responsive to said amplifying and detecting circuit; and a multiplexer responsive to said noise canceller having an input terminal for entering a voltage for high-cut control and another input terminal for entering a voltage for stereo noise control, said automatic frequency control circuit comprising:

first means extracting, rectifying and smoothing ac components in said signal meter driving voltage;

second means extracting, rectifying and smoothing noise components in an output from said noise canceller;

third means summing output voltages from said first and second means;

fourth means extracting dc components in said signal meter driving voltage and comparing them with the sum voltage from said third means;

fifth means responsive to an output from said forth means to generate an output voltage corresponding to the difference between said dc components and said sum voltage; and sixth means applying an output from said fifth means to said input terminals of said multiplexer.

2. A circuit of claim 1 wherein said first means comprises an ac component detector, a rectifier and a smoothing circuit.

3. A circuit of claim 1 wherein said second means comprises a high-pass filter, a noise amplifier, a rectifier and smoothing circuit.

* * * * *